2,987,987
PELLETING APPARATUS

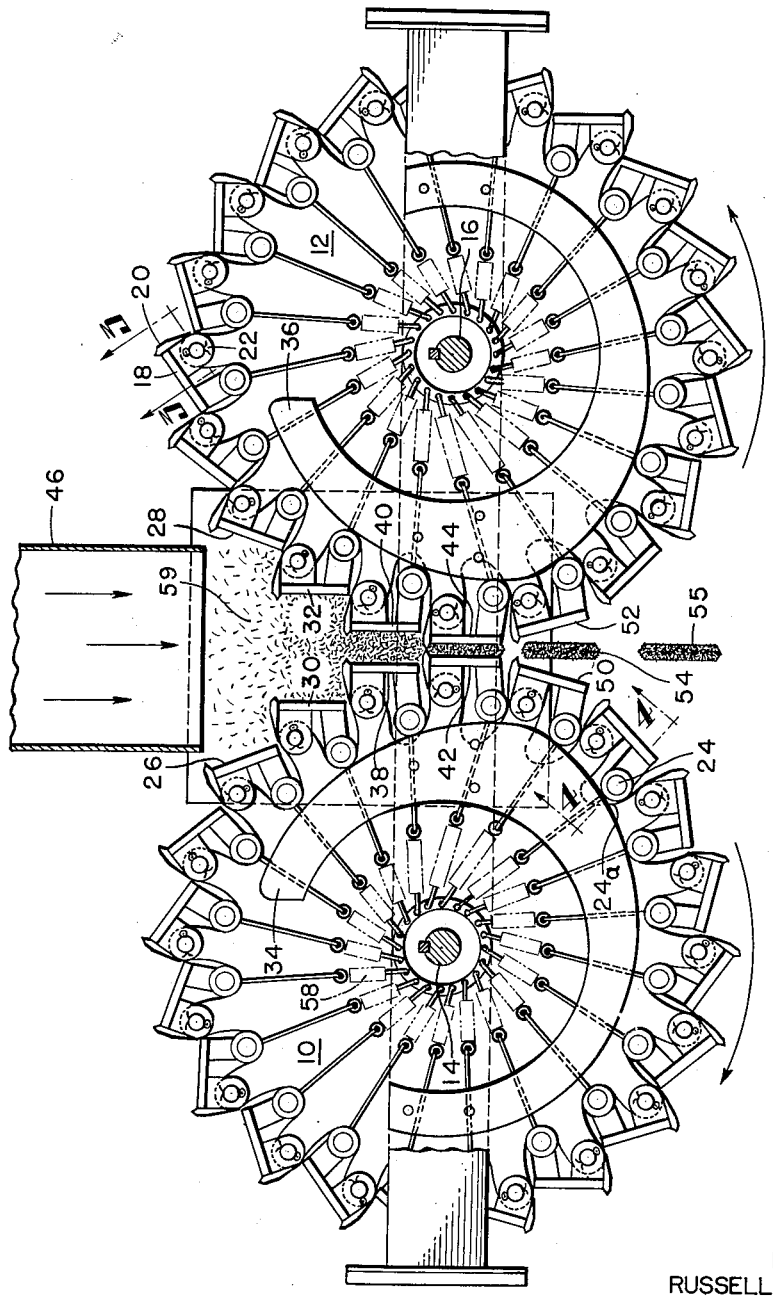
INVENTORS.
RUSSELL R. RANEY.
TED STOTT.
PAUL A. LUTHMAN.
JAMES E. RICHARDS.
ATTORNEYS.

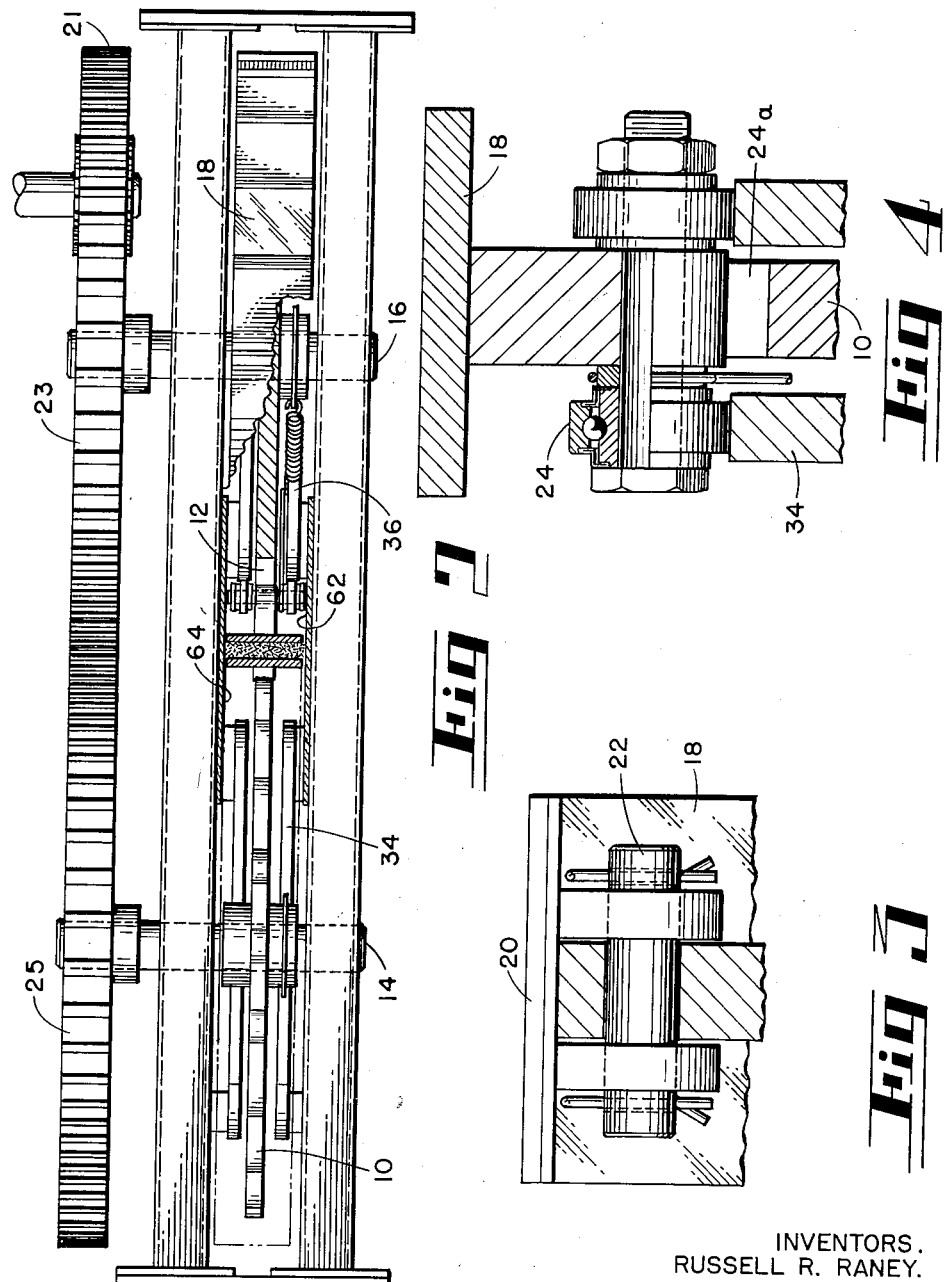

Russell R. Raney, Greenville, Ted Stott, Celina, Paul A. Luthman, Maria Stein, and James E. Richards, Celina, Ohio, assignors to Avco Manufacturing Corporation, New Idea Division, Coldwater, Ohio, a corporation of Delaware Filed June 27, 1958, Ser. No. 744,964
4 Claims. (Cl. 100—98)

This invention relates to a pelleting apparatus primarily designed for compacting and forming pellets from fibrous crop material, such as hay.

It is important that the pellets be made in such manner that they are of substantially uniform compaction, and it is important that the pellets be produced rapidly in a continuous operation. This mechanism must also be usable in such manner as to receive chopped material and to automatically and in a continuous feeding process convert this chopped material into pellets. The actual size and shape of acceptable pellets may vary, but pellets of the order of 3 inches across by ⅜ to ½ inch thickness have been considered as of satisfactory size.

It is therefore a primary object of this invention to provide a continuously operating automatic means for converting chopped material of fibrous crops into compacted pellets of the type which can be fed to livestock, which can be handled by bulk handling machinery and which will make possible the easy and efficient storage of crop material when compacted into a relatively small space and thus avoid the major amount of storage space necessary. Such conditions will make it possible to harvest a crop, such as hay, with a minimum of labor and with an efficient time factor.

The above and other objects of this invention will appear more fully from the following more detailed description and by reference to drawings accompanying and forming a part hereof, and wherein:

FIGURE 1 is a side view of the assembled unit having two parallel counter-rotatable wheels operable as carrying units for pellet compacting heads.

FIGURE 2 is a top view partly in section of the unit shown in FIGURE 1.

FIGURE 3 is a section on line 3—3 of FIGURE 1.

FIGURE 4 is a section on line 4—4 of FIGURE 1.

Two wheels 10 and 12 are mounted for rotation upon parallel axes or shafts 14, 16. The wheels each have attached to their periphery a plurality of so-called compacting heads 18. These heads are in the form of metal members for forming the shape of the pellet, having a width and length such as to determine the size of a pellet to be formed, and at one end of each of these tiltable heads there is a knife or dividing member 20. The actual shape of the pellets may be varied by change in the form of the face of the compacting heads 18. Each of the heads is pivoted near the periphery of the wheels on a pivot 22 and carries at its opposite end a roller member 24 so that the head is tiltable upon the pivot 22 and is so positioned relative to the wheel on which it is mounted that there is a maximum downward position of the tilted head as shown when the roller 24 is positioned at the bottom of the slot 24a. On each of the wheels there is a plurality of spaced heads 22, and in the mechanism illustrated there are twenty tiltable heads.

The two wheels 10, 12 are driven in synchronism by gears 21, 23, 25 (FIGURE 2), so that as pairs of heads, one on each wheel, approach other, as at 26, 28, there is a definite tilt of the pair of heads as shown at 26, 28 and they are approaching each other at substantially the same relative angle but tilted oppositely and away from each other. The wheels rotate in opposite directions, as shown by the arrows, and it will appear that at the position at the top of the wheels the roller members 24, which are substantially the same on each head, will remain at bottom of slots 24a until contact with cams 34, 36, positioned on the frame adjacent the wheels. As the wheels continue to rotate the cams 34, 36 are so formed that with the rollers 24 contacting the cams each pair of heads is tilted toward substantial parallelism as is shown by the location of the heads at 38, 40, and as they approach still further toward the region of near-tangency of the two wheels the cam arrangement is such that the relationship is near parallelism at position 42, 44, which is the closest approach of the two compacting heads.

It is therefore found on consideration of the mechanism that if chopped material is fed from an inlet 46 from the top downwardly into the region where the pairs of heads are coming together in the manner just described, that material caught between the approaching heads will be compacted from a volume which would be determined by the distance between the heads 26, 28, for instance, and would eventually be compacted by the near parallel relationship of the heads until the material is compacted at the position 42, 44 and at the position 52, which is the position just beyond closest tangency of the wheels, the heads will then start a path of departure from each other and the compacted pellet will be released as shown at 54, 55 in the drawings. Projecting knife or severing members 20, one on each head, coact to sever the material and to divide the compacted band of material into pellets during the above operations.

It is also to be noted that the heads 18 are each of them held in the position tilted toward the wheel in maximum amount by spring units 58, and a plurality of such spring units corresponding to the number of heads is provided, the cams 34, 36 causing tilting movement against the resilient connections in the region of compacting as has been described above.

It appears that with the mechanism as shown, the crop material coming into the unit from the inlet 46 will be fed into the region 59 between the two wheels and will be picked up by the approaching heads, and as the heads approach each other they are caused to carry along in a path which is so defined by the design of the cams 34, 36, that the tilting of the heads is such that they approach near-parallelism with each other and therefore make a uniform compaction of material as the heads approach each other until the maximum compacting point is reached and the heads again recede from each other. The width of the pellet is determined by the width of the heads and the width is defined by retaining plates 62, 64, and the heads are of such a width that they pass between the two plates 62, 64 with a running clearance.

The mechanism in operation provides a series of coacting pairs of compacting heads 18 having opposed compacting faces and projecting knife or severing members 20. The two adjacent counter-rotating wheels 10, 12 are in effect head carrying members synchronously movable by their connected gearing 21, 23, 25, each operable to carry a series of pairs of coacting compacting heads 18 in paths of movement approaching each other. The cams 34, 36 provided are for tilting the compacting heads and are operable for tilting the series of pairs of heads in their approaching movement so that their faces (or an equivalent longitudinal plane through the pellet-forming face or cavity of each head) approach substantial parallelism during the time they are moving between the two spaced plates, and therefore the material which is fed from the upwardly positioned feeding member 46 is compacted between the two plates as the successive series of pairs of compacting heads approach each other. The heads are carried on the periphery of the wheels to a region of near-tangency, and this region is where the maximum compacting of the material is accomplished. The approaching pairs of compacting heads moving between the two plates produce a compacting chamber of decreasing volume as the compacting heads approach each other and reach their minimum distance apart at the position of the closest approach to tangency of the path of the rotating tilted heads. The moving band of compacted material is divided into pellets of finite length by the projecting severing knife members 20, one of which is carried on each head and which are relatively positioned to coact to sever the material as the knife members on each pair of heads approach each other.

It is understood that although the counter-rotating wheels with the series of tilting heads carried on the periphery is a very satisfactory and practical mechanism for accomplishing this result, that such result might be accomplished by other means, such as a series of heads carried in a track or by other means causing the approach of tilted compacting heads toward each other in a path such that they would cause a gradual decrease in the volume of the chamber formed by the approaching pairs of tilted compacting faces.

It is also contemplated that the faces of the heads may be formed in various cavity forming shapes other than flat surfaces as shown. Although the shape of the pellets is an important consideration, the problem is not considered as such in the present disclosure, and a flat face head is therefore used for illustration. The term "face" as used herein is intended to include other shapes, and where parallel relationships of faces are mentioned the term is intended to include a longitudinal plane through the cavity formed by a variant shape.

It is therefore contemplated that various modifications may be made without departing from the principles as set forth in the following claims.

We claim:

1. In a pelleting mechanism of the character described, a pair of spaced plates, a series of co-acting pairs of compacting heads having opposed compacting faces, two adjacent head carrying members synchronously movable each carrying one of each pair of said compacting heads between said spaced plates in paths of movement approaching each other thereby to form a compacting chamber, a pivot for each of said compacting heads mounting each of said heads for tilting movement on its head carrying member, a tilting mechanism adjacent said head carrying members comprising contacting elements positioned and formed to tilt said pairs of co-acting compacting heads during their approaching movement between said plates in such relation that said co-acting pairs of compacting faces are in near parallelism during their movement between said plates, and feeding means for feeding material to be pelleted into said chamber between said spaced plates.

2. In a pelleting mechanism according to claim 1, in which each one of each pair of compacting heads is provided with a projecting severing member positioned between said heads to co-act with said head and to sever across a moving band of compacted material thereby to effect a division of the moving band of compacted material into individual pellets.

3. In a pelleting mechanism according to claim 1, in which the said tilting mechanism contacting elements adjacent said head carrying members include cam means formed and positioned to tilt said compacting heads toward parallelism in their approach to the region of near tangency and resilient means to urge said compacting heads away from parallelism against the action of said cam means.

4. In a pelleting mechanism of the character described, the combintion of a pair of adjacent counter-rotating wheels positioned with their peripheries in the same plane and approaching near to tangency in one region, spaced plates forming two sides of a compacting chamber in the said region of near tangency and positioned on opposite sides of said wheels and in substantial parallelism with the plane of rotation of said wheels, spaced compacting heads carried by said wheels and mounted for tilting movement adjacent the peripheries of said wheels, compacting faces on said heads shaped to form pellets when a pair of said heads, one on each wheel, approach each other in the said region of near tangency between said plates, cam means controlling the tilting movement of said heads and so formed as to cause said opposing faces of said heads to move in near parallelism with each other during the time said heads are moving toward each other in the said chamber formed by said spaced plates, thereby providing a decreasing compacting volume in said chamber formed by said opposed near parallel faces as said heads approach each other, and feeding means for feeding material to be pelleted into said chamber.

References Cited in the file of this patent

UNITED STATES PATENTS

| | | |
|---|---|---|
| 289,397 | Dietz | Dec. 4, 1883 |
| 516,023 | Rice | Mar. 6, 1894 |
| 1,055,384 | Brune et al. | Mar. 11, 1913 |
| 2,528,531 | McCulloch | Nov. 7, 1950 |
| 2,717,419 | Dickey | Sept. 13, 1955 |